United States Patent
Hayashi

(10) Patent No.: US 8,868,835 B2
(45) Date of Patent: Oct. 21, 2014

(54) CACHE CONTROL APPARATUS, AND CACHE CONTROL METHOD

(75) Inventor: Kunihiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 198 days.

(21) Appl. No.: 13/253,456

(22) Filed: Oct. 5, 2011

(65) Prior Publication Data

US 2012/0030430 A1 Feb. 2, 2012

Related U.S. Application Data

(63) Continuation of application No. PCT/JP2009/006668, filed on Dec. 7, 2009.

(30) Foreign Application Priority Data

Apr. 8, 2009 (JP) ................................. 2009-094361

(51) Int. Cl.
*G06F 15/16* (2006.01)
*G06F 12/08* (2006.01)

(52) U.S. Cl.
CPC ........ *G06F 12/0864* (2013.01); *G06F 12/0842* (2013.01)
USPC ......................................... 711/128; 711/118

(58) Field of Classification Search
None
See application file for complete search history.

(56) References Cited

U.S. PATENT DOCUMENTS

| 6,516,387 | B1* | 2/2003 | Auracher ..................... 711/123 |
| 7,237,067 | B2* | 6/2007 | Steely, Jr. ..................... 711/133 |
| 7,325,097 | B1* | 1/2008 | Darcy ........................... 711/117 |
| 2002/0194433 | A1 | 12/2002 | Yamazaki |
| 2004/0148466 | A1 | 7/2004 | Morishita et al. |
| 2007/0136530 | A1* | 6/2007 | Tanaka ........................ 711/128 |
| 2008/0065833 | A1* | 3/2008 | Hosoki et al. ................. 711/130 |
| 2008/0250260 | A1* | 10/2008 | Tomita ......................... 713/324 |

FOREIGN PATENT DOCUMENTS

| JP | 07-248967 | 9/1995 |
| JP | 2002-342163 | 11/2002 |
| JP | 2002-373115 | 12/2002 |
| JP | 2004-178571 | 6/2004 |

OTHER PUBLICATIONS

Wikipedia, Smackbot, Dec. 17, 2009.*
International Search Report dated Jan. 12, 2010.

* cited by examiner

*Primary Examiner* — Matthew Bradley
*Assistant Examiner* — Candice Rankin
(74) *Attorney, Agent, or Firm* — McDermott Will & Emery LLP

(57) ABSTRACT

A cache control apparatus according to the present invention includes a cache allocation control unit which allocates each of a plurality of ways included in a cache memory to one or more of tasks to be executed by a plurality of processors. In the case where a group of ways includes an unallocated way that is not allocated to any of the tasks and a way allocated to one or more of the tasks which is to be executed by one of the processors, the cache allocation control unit allocates the unallocated way included in the group to the one or more of the tasks to be executed by the one of the processors.

7 Claims, 8 Drawing Sheets

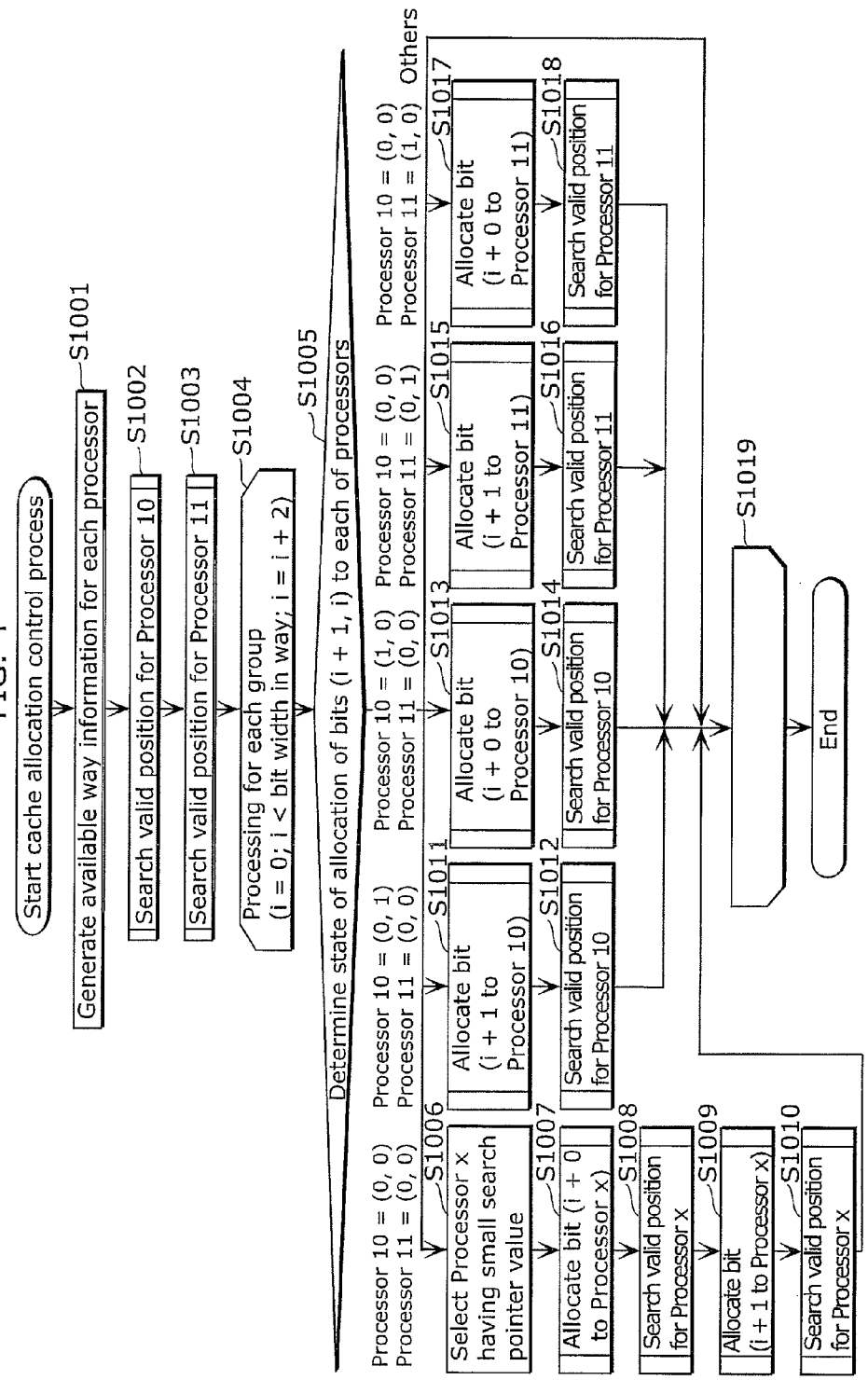

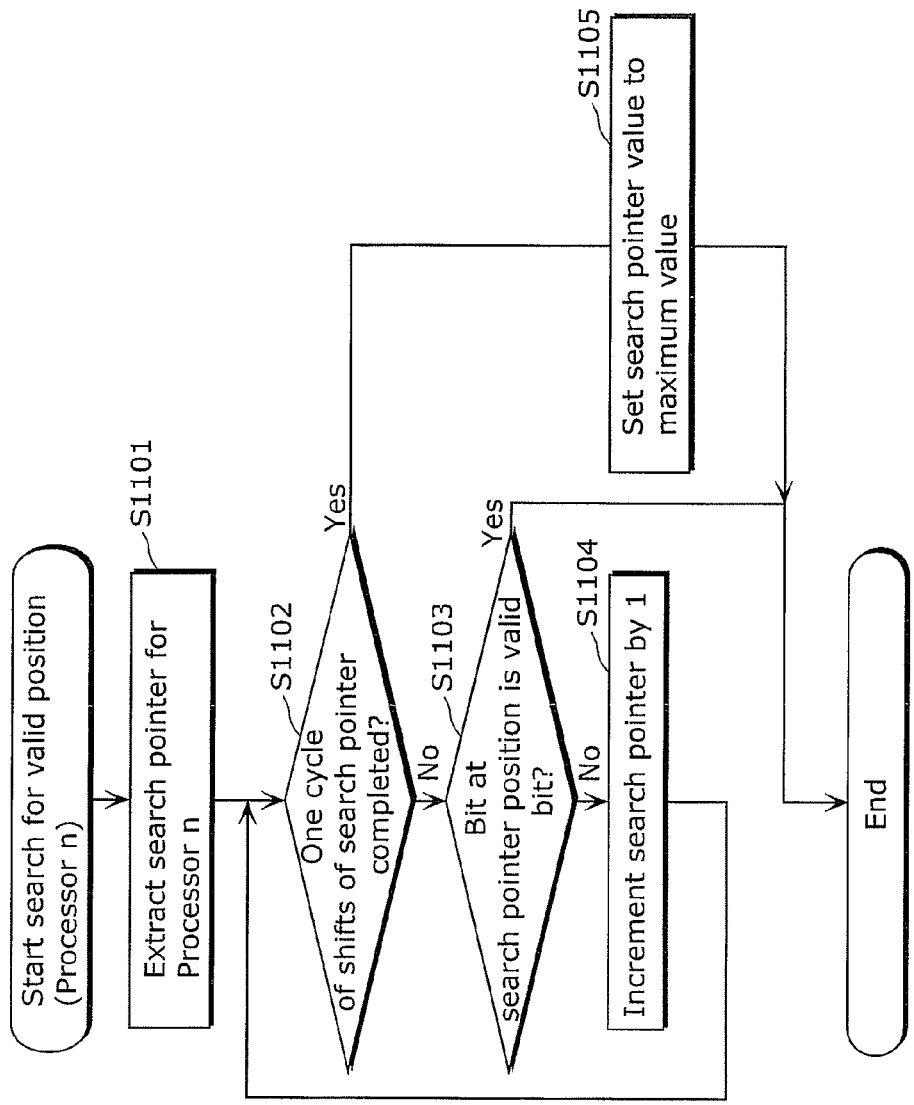

CACHE CONTROL APPARATUS, AND CACHE CONTROL METHOD

CROSS REFERENCE TO RELATED APPLICATION

This is a continuation application of PCT application No. PCT/JP2009/006668 filed on Dec. 7, 2009, designating the United States of America.

BACKGROUND OF THE INVENTION (1) Field of the Invention

The present invention relates to cache control apparatuses and cache control methods, and in particular to a cache control apparatus which controls a set-associative cache memory shared by a plurality of processors.

(2) Description of the Related Art

Processor systems each including a plurality of processors are classified into tightly-coupled systems in which the same data is accessed by processors which share memory space and loosely-coupled systems in which data is sent and received between processors via a communication means. The tightly-coupled systems are further classified into a system in which a cache memory is shared by processors and a system in which each of processors includes a cache memory.

FIG. 9 is a block diagram showing a configuration of a multiprocessor system of a tightly-coupled system in which a cache memory is shared by processors. The processor system 200 shown in FIG. 9 includes processors 10 and 11, a memory bus 20, a cache control apparatus 201, a cache memory 50, and a main memory 60.

The processors 10 and 11 access the main memory 60 via the memory bus 20.

The cache control apparatus 201 controls the cache memory 50. This cache control apparatus 201 includes a cache control unit 30, and a cache allocation control unit 240.

The cache control unit 30 controls access from the processors 10 and 11 to the main memory 60 in the following manner. In the case where read access is made to the main memory 60 and a target data to be accessed is present in the cache memory 50 (in the case of a cache hit), the cache control unit 30 accesses the cache memory 50 instead of accessing the main memory 60. Generally, access to the cache memory 50 is faster than access to the main memory 60. Thus, the use of the cache memory 50 reduces the time required for the memory access, and thus increases the performance of the whole system.

In the opposite case where the target data is not present in the cache memory 50 (in the case of a cache miss), the cache control unit 30 reads out the data from the main memory 60 and writes the data into the cache memory 50. This enables the cache control unit 30 to access the cache memory 50 when access to the same data is made next.

In addition, in the case where write access to the main memory 60 is made, the cache control unit 30 writes the data into the main memory 60 and also into the cache memory 50. In this way, the coherency of the data is assured between the cache memory 50 and the main memory 60.

The cache allocation control unit 240 allocates parts of the cache capacity of the cache memory 50 to processing units or tasks. Here, a task is a unit of control for integrally managing a flow of processes such as activation, execution, termination, etc. of a program which functions under control of an operating system. There are various kinds of cache capacity allocation methods. For example, in the case where the cache memory 50 is a set-associative cache memory, the cache memory 50 is segmented into fixed capacity units each called a "way". The cache allocation control unit 240 allocates ways 51a to 51f to processing units or tasks.

Alternatively, the cache memory 50 may be composed of hardware units each called a "memory macrocell". The cache control apparatus 201 includes, for each of the units, an address calculator, a buffer circuit, a bus arbitrating circuit, etc. Here, an increase in the number of memory macrocells increases the size of the circuit. An increase in the size of the LSI disables fast transmission. This makes it impossible to expect an increase in frequency. A memory macrocell including a plurality of ways solves this problem because the use of such a memory macrocell enables reduction in the number of memory macrocells. For example, in FIG. 9, a pair of the way 51a and the way 51b is included in a memory macrocell. Likewise, a pair of the way 51c and the way 51d and a pair of the way 51e and the way 51f are included in respectively corresponding ones of memory macrocells.

However, since various kinds of circuits are shared within each memory macrocell, access arbitration is performed resulting in latency in the case where access to one of the ways in a memory macrocell and access to another one of the ways in the memory macrocell are made at the same time. Thus, a memory macrocell including many ways frequently requires latency and thus is disadvantageous in terms of processing speed.

In order to solve this problem, the cache allocation control unit 240 is configured to dynamically change the parts of the cache capacity to be allocated to the respective processors 10 and 11 that share the cache memory 50, according to the priority for the processes performed by the processors 10 and 11. In this way, the conventional cache control apparatus 201 enables the processor which executes a process with a high priority to use a large part of cache capacity (for example, see Patent Reference 1: Japanese Unexamined Patent Publication No. 7-248967).

SUMMARY OF THE INVENTION

However, since the conventional cache control apparatus 201 allocates the parts of the cache capacity according to the priority for processes to be performed by processors, the allocated parts are determined depending only on the respective priority. For this reason, the conventional cache control apparatus 201 is incapable of flexibly allocating the parts of the cache capacity required for the processes. For this reason, there is a case where the capacity becomes insufficient in a system required to assure processing performance. In such a case, the system cannot assure the performance.

In addition, the conventional cache control apparatus 201 inevitably produces idle resources which cannot be used when the cache capacity exceeds a required capacity. As mentioned above, the conventional cache control apparatus 201 has a problem of being incapable of effectively utilizing the cache capacity.

Furthermore, when cache access by each of two tasks is made at the same time in the case where the two tasks each having an allocated way function on mutually different processors, and these ways are present in a memory macrocell, the conventional cache control apparatus 201 cannot prevent access collision even when the access target ways are different and thus suspends execution of one of the two tasks. As mentioned above, the conventional cache control apparatus 201 has a problem that an access delay occurs.

The present invention has been conceived in view of this with an aim to provide a cache control apparatus and a cache control method which effectively utilize idle resources and thereby reduce occurrence of access delay.

In order to solve the aforementioned problems, a cache control apparatus according to an aspect of the present invention is a cache control apparatus which controls a set-associative cache memory shared by a plurality of processors, wherein the cache memory includes a plurality of ways, and the ways are divided into groups each of which includes one or more of the ways, and the cache control apparatus includes a cache allocation control unit configured to perform a cache allocation process of allocating each of the ways to one or more of tasks which are executed by the processors, wherein in the case where one of the groups includes an unallocated way which is included in the ways and is not yet allocated to any of the tasks and a way which is included in the ways and is already allocated to one or more of the tasks each of which is executed by a corresponding one of the processors, the cache allocation control unit is configured to allocate the unallocated way included in the one of the groups to a corresponding one or more of the tasks each of which is executed by the corresponding one of the processors.

With this structure, the cache control apparatus according to an aspect of the present invention is capable of allocating each of idle unallocated ways to one or more of tasks, that is, allocating each of the idle resources to the one or more of tasks. Furthermore, the cache control apparatus according to the aspect of the present invention allocates the unallocated way to the one or more tasks that belong to the processor having a task associated with the way included in the group (memory macrocell) including the unallocated way. In this way, the way included in the group is allocated to the task(s) to be executed by the corresponding processor. Thus, the cache control apparatus according to the aspect of the present invention prevents cache access collision that occurs if different processors access the way included in the group. In this way, the cache control apparatus according to the aspect of the present invention is capable of reducing occurrence of access delay.

In addition, in the case where none of the ways included in the one of the groups is already allocated to any of the tasks, the cache allocation control unit may be configured to allocate each of the ways included in the one of the groups to one or more of the tasks each of which is executed by one of the processors having a smallest number of tasks which are already associated, in the cache allocation process, with corresponding ones of the ways.

With this structure, the cache control apparatus according to the aspect of the present invention is capable of preferentially allocating the way to the task(s) of the processor having the smallest number of allocated ways. In this way, the cache control apparatus according to the aspect of the present invention is capable of evenly allocating the ways to the respective processors.

In addition, the cache control apparatus may further include a storage unit configured to store way information indicating each of the ways allocated to a corresponding one or more of the tasks, wherein the cache allocation control unit may be configured to determine the unallocated way with reference to the way information.

With this structure, the cache control apparatus according to the aspect of the present invention is capable of easily assuring the processing performances for the tasks by previously setting, in the way information, the parts of the cache capacity for the respective tasks.

In addition, the storage unit may be further configured to store a search pointer which is provided, for each of the processors, to specify one of the ways, and, the cache allocation control unit may include: a way specifying unit configured to cause the search pointer to specify, for each of the processors, one of the ways which is already allocated to a corresponding one or more of the tasks of the processor; and an allocating unit configured to allocate the unallocated way to the one or more tasks associated, by the allocation, with the way specified by the search pointer, the one or more tasks being included in the tasks which are executed by the processor, wherein the way specifying unit may be configured to shift the way specified by the search pointer to a next one of the ways which is positioned next in a predetermined order from among some of the ways each of which is already associated with a corresponding one or more of the tasks of the processor, the shift being made each time one of the ways is allocated to a corresponding one or more of the tasks by the allocating unit.

With this structure, the cache control apparatus according to the aspect of the present invention is capable of evenly allocating the ways to the tasks to be executed by the respective processors.

In addition, the cache allocation control unit may further include an available way information generating unit which is provided for each of the processors, and may be configured to generate available way information including a bit sequence and store the available way information in the storage unit, the bit sequence may include bits each of which is associated with a corresponding one of the ways and indicates whether or not the corresponding one of the ways is already allocated to one or more of the tasks each of which is executed by the corresponding one of the processors, and the way specifying unit may be configured to shift the way which is specified by the search pointer to the next one of the ways positioned next in an order of the bits in the bit sequence from among the some of the ways already associated with corresponding one or more of the tasks of the processor, the shift being made each time the one of the ways is allocated to the corresponding one or more of the tasks by the allocating unit.

With this structure, the cache control apparatus according to the aspect of the present invention is capable of sequentially selecting the tasks so that the ways are evenly allocated to the tasks to be executed by the processors.

In addition, a value of the search pointer of each of the processors may be a sum of the numbers of bits shifted in the bit sequence by the way specifying unit, and when none of the ways included in one of the groups is already allocated to any of the tasks, the cache allocation control unit may be configured to allocate each of the ways included in the one of the groups to a corresponding one or more of the tasks each of which is executed by a corresponding one of the processors which has a smallest search pointer value.

With this structure, the cache control apparatus according to the aspect of the present invention is capable of evenly allocating the ways to the respective processors.

In addition, the cache allocation control unit may be configured to set the value of the search pointer for the corresponding one of the processors to a maximum value when none of the ways is already allocated to any of the tasks each of which is executed by the corresponding one of the processors.

With this structure, the cache control apparatus according to the aspect of the present invention can avoid allocating a way to a processor that does not have any allocated way in an initial state.

In addition, the cache allocation control unit may be configured to perform the cache allocation process at a time when some of the tasks are generated or canceled.

With this structure, the cache control apparatus according to the aspect of the present invention is capable of allocating the ways without affecting the task processing.

It is to be noted that the present invention can be implemented as such a cache control apparatus, and can further be realized as a cache control method having the steps corresponding to the unique units of the cache control apparatus and as a program causing a computer to execute the unique steps. As a matter of course, such a program can be distributed via recording media such as a CD-ROM and a transmission media such as the Internet.

Furthermore, the present invention can be implemented as a semiconductor integrated circuit (LSI) which has part or all of the functions of such a cache control apparatus, and as a processor system including such a cache control apparatus.

As described above, the present invention can provide a cache control apparatus and a cache control method which effectively utilize surplus resources and thereby reduce occurrence of access delay.

Further Information about Technical Background to This Application

The disclosure of Japanese Patent Application No. 2009-094361 filed on Apr. 8, 2009 including specification, drawings and claims is incorporated herein by reference in its entirety.

The disclosure of PCT application No. PCT/JP2009/006668 filed on Dec. 7, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a flowchart indicating a cache allocation procedure taken by the cache allocation control unit according to the embodiment of the present invention;

FIG. 5 is a flowchart indicating operations performed by a valid position search unit according to the embodiment of the present invention;

DESCRIPTION OF THE PREFERRED EMBODIMENT

Hereinafter, an embodiment of a cache control apparatus according to the present invention is described with reference to the drawings.

The cache control apparatus according to the embodiment of the present invention allocates an idle way to one or more tasks of the processor including a task associated with an allocated way in the same group (memory macrocell) including the idle way. In this way, the cache control apparatus according to the embodiment of the present invention can prevent cache access collision between the different processors, and thus can reduce occurrence of access delay and effectively utilize the surplus resources.

First, a description is given of a configuration of a processor system including the cache control apparatus according to the embodiment of the present invention.

Figure 1:
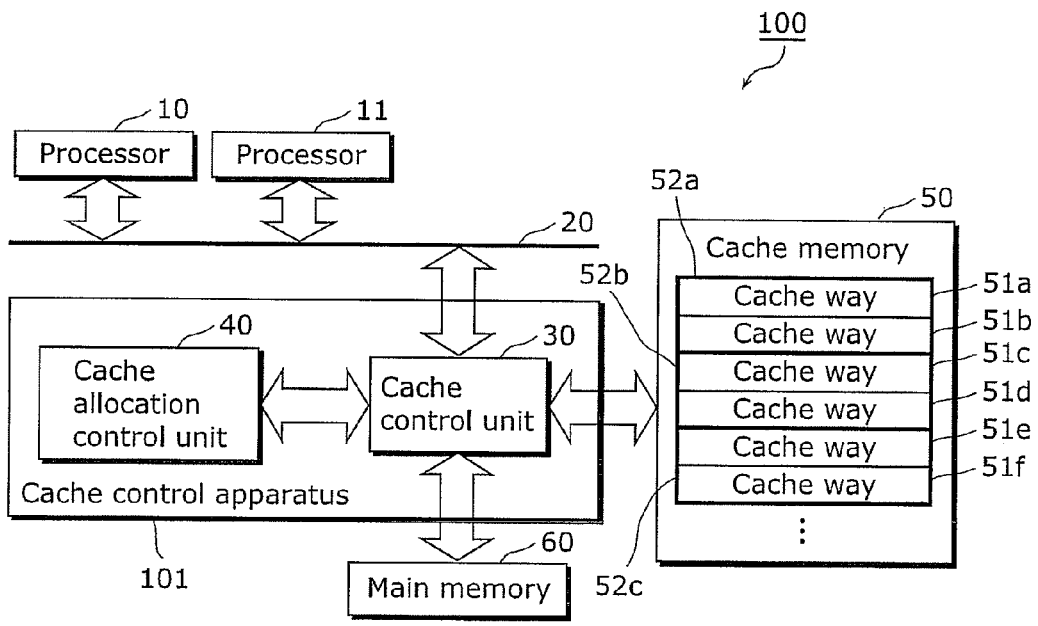
FIG. 1 is a block diagram showing a configuration of a processor system according to an embodiment of the present invention.

FIG. 1 is a block diagram showing a configuration of the processor system 100 according to the embodiment of the present invention.

Figure 9:
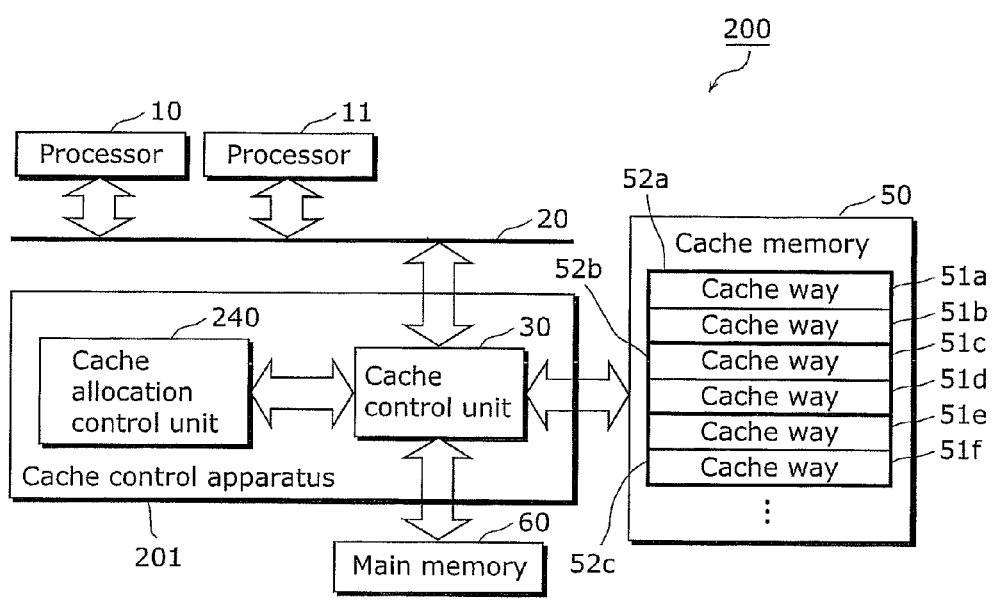
FIG. 9 is a block diagram showing a configuration of a conventional processor system.

The processor system 100 shown in FIG. 1 includes processors 10 and 11, a memory bus 20, a cache control apparatus 101, a cache memory 50, and a main memory 60. It is to be noted that the same elements as in FIG. 9 are assigned with the same numerical references.

In this example, the processor system 100 includes two processors 10 and 11. However, the numbers of processors are not limited to two, and three or more processors may be included in the processor system 100.

The processors 10 and 11 access the main memory 60 via the memory bus 20.

The cache control apparatus 101 controls the cache memory 50. This cache control apparatus 101 includes a cache control unit 30, and a cache allocation control unit 40.

The cache control unit 30 controls access from the processors 10 and 11 to the main memory 60 in the following manner. In the case where read access is made to the main memory 60 and a target data to be accessed is present in the cache memory 50 (in the case of a cache hit), the cache control unit 30 accesses the cache memory 50 instead of accessing the main memory 60. Generally, access to the cache memory 50 is faster than access to the main memory 60. Thus, the use of the cache memory 50 reduces the time required for the memory access, and thus increases the performance of the whole system.

In the opposite case where the target data is not present in the cache memory 50 (in the case of a cache miss), the cache control unit 30 reads out the data from the main memory 60 and writes the data into the cache memory 50. This enables the cache control unit 30 to access the cache memory 50 when access to the same data is made next.

In addition, in the case where write access to the main memory 60 is made, the cache control unit 30 writes the data into the main memory 60 and also into the cache memory 50.

In this way, the coherency of the data is assured between the cache memory 50 and the main memory 60.

The cache memory 50 conforms to the set-associative scheme. This cache memory 50 includes a plurality of ways 51a to 51f. The plurality of ways 51a to 51f are also referred to as ways 51 when there is no need to differentiate these ways from each other.

Alternatively, the cache memory 50 may be composed of hardware units each called a "memory macrocell". The cache control apparatus 101 includes, for each of the units, an address calculator, a buffer circuit, a bus arbitrating circuit, etc. For example, in FIG. 1, a pair of the way 51a and the way 51b is included in a memory macrocell. Likewise, a pair of the way 51c and the way 51d and a pair of the way 51e and the way 51f are included in corresponding ones of memory macrocells. In other words, the plurality of ways 51 are divided into groups (memory macrocells) 52a, 52b, and 52c each including several ways 51. The groups 52a, 52b, and 52c are also referred to as groups 52 when there is no need to differentiate these groups from each other.

The cache allocation control unit 40 performs cache allocation of allocating, to the tasks to be executed by the processors 10 and to the tasks to be executed by the processors 11, ways 51 which are not yet allocated to any of the tasks from among the ways 51 included in the cache memory 50. Here, a task is a unit of control for integrally managing a flow of processes such as activation, execution, termination, etc. of a program which functions under control of an operating system.

In addition, the cache allocation control unit 40 sequentially allocates, for each group 52, an unallocated way to one or more tasks.

More specifically, in the case where a group 52 includes an unallocated way (which is a way 51 not yet allocated to any task) and another way 51 allocated to one or more of the tasks to be executed by one of the processors 10 and 11, the cache allocation control unit 40 allocates the unallocated way included in the group 52 to one or more of the tasks to be executed by the one of the processors 10 and 11.

Furthermore, in the case where none of the ways 51 included in a group 52 is not yet allocated to tasks, the cache allocation control unit 40 allocates the ways 51 to the tasks to be executed by one of the processors 10 and 11 which has a smaller number of tasks already allocated in the cache allocation process.

The cache allocation control unit 40 is described in detail below.

Figure 2:
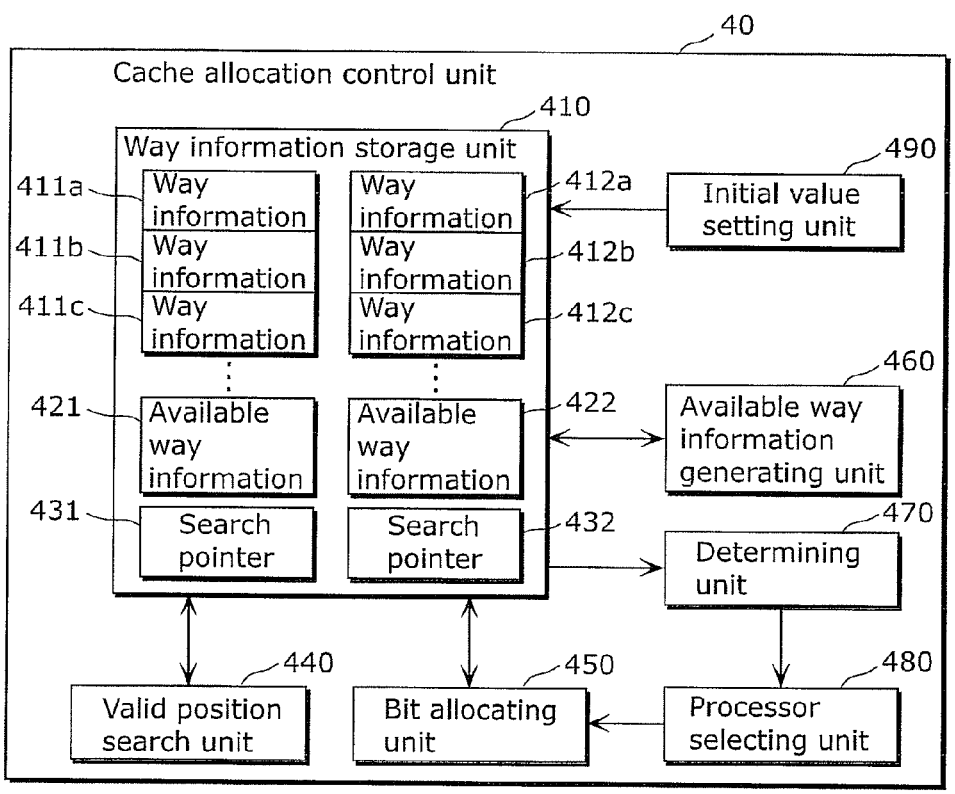
FIG. 2 is a block diagram showing a structure of a cache allocation control unit according to the embodiment of the present invention.

FIG. 2 is a block diagram showing a structure of a cache allocation control unit 40 according to the embodiment of the present invention. In addition, FIG. 2 schematically shows functions of the cache allocation control unit 40 in the case where cache allocation control as part of the functions of the operating system is performed when one of the processors 10 and 11 executes software (a program). It is to be noted that part or all of the functions of the cache allocation control unit 40 may be implemented by hardware (an exclusive circuit).

As shown in FIG. 2, the cache allocation control unit 40 includes a way information storage unit 410, a valid position search unit 440, a bit allocating unit 450, an available way information generating unit 460, a determining unit 470, a processor selecting unit 480, and an initial value setting unit 490.

The way information storage unit 410 corresponds to a storage unit according to the present invention, and stores way information 411a, 411b, 411c . . . , 412a, 412b, 412c . . . , available way information 421 and 422, and search pointers 431 and 432. Here, the way information 411a, 411b, 411c . . . , the available way information 421, and the search pointer 431 relate to the processor 10, and the way information 412a, 412b, 412c . . . , the available way information 422, and the search pointer 432 relate to the processor 11.

Here, the way information 411a, 411b, 411c . . . are referred to as way information 411 when there is no need to differentiate these items of way information from each other. Likewise, the way information 412a, 412b, 412c . . . are referred to as way information 412 when there is no need to differentiate these items of way information from each other.

Each of the way information 411 and 412 indicates a corresponding way 51 allocated to one or more of the tasks to be executed by a corresponding one of the processor 10 and 11.

Each of the available way information 421 and 422 indicates whether or not a corresponding way 51 is allocated to one or more of the tasks to be executed by a corresponding one of the processors 10 and 11.

Each of the search pointers 431 and 432 is provided for a corresponding one of the processors 10 and 11, and shows a valid position specifying one of the ways 51. This valid position is used in the later-described processes of selecting one of the processors 10 and 11 to which a current way 51 is allocated and selecting one or more tasks to which the current way 51 is allocated.

Figure 3A:
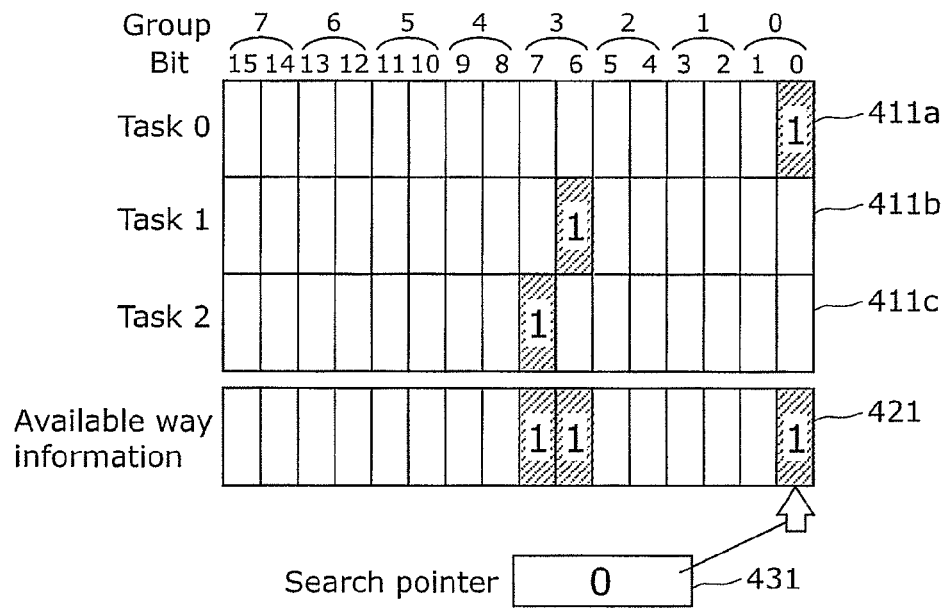
FIG. 3A is a diagram showing an example of an initial state of a way information storage unit according to the embodiment of the present invention.
Figure 3B:
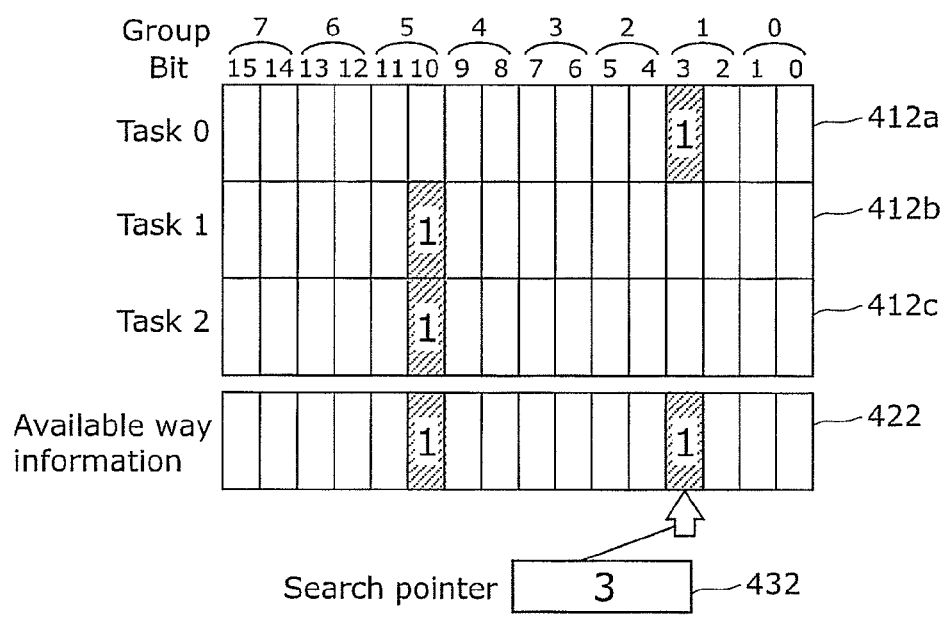
FIG. 3B is a diagram showing an example of an initial state of a way information storage unit according to the embodiment of the present invention.

Each of FIG. 3A and FIG. 3B is a diagram showing an example of an initial state of the way information storage unit 410.

As shown in FIG. 3A, the way information 411 is provided for each task that functions on the processor 10. Likewise, as shown in FIG. 3B, the way information 412 is provided for each task that functions on the processor 11. Each of the way information 411 and 412 includes a bit sequence. In a bit sequence, bits 0, 1, 2, . . . are arranged in this order from the right. In addition, each bit is associated with a corresponding one of ways 51 included in the cache memory 50. When a bit n is valid (when the bit shows 1), a way n is available for the task. In addition, when the bit n is invalid (when the bit n shows 0), the way n is not available for the task. The bit width of each of the way information 411 and 412 exactly corresponds to the number of ways included in the cache memory 50. For example, in each of the examples shown in FIG. 3A and FIG. 3B, the number of ways is 16, and each of the way information 411 and 412 is 16 bits.

The available way information 421 and 422 are provided for each of the processors 10 and 11. Each of the available way information 421 and 422 includes a bit sequence. In a bit sequence, bits 0, 1, 2, . . . are arranged in this order from the right. In addition, each bit is associated with a corresponding one of the ways 51 included in the cache memory 50. A bit of "1" corresponds to a way which is already allocated to one or more of the tasks which belong to a corresponding one of the processors 10 and 11, and a bit of "0" corresponds to a way which is not yet allocated to any of the tasks. It is to be noted that in each of FIG. 3A and FIG. 3B, "0" is omitted in the bit sequences respectively included in the way information 411 and 412 and the available way information 421 and 422.

Search pointers 431 and 432 are provided for each of the processors, and each of the search pointers 431 and 432 holds an integer equal to or larger than 0. The numerical value held by the search pointer 431 shows bit positions of way information 411 and available way information 421. Likewise, the numerical value held by the search pointer 432 shows bit positions of way information 412 and available way information 422. In addition, the value of the search pointer 431 shows the sum of the numbers of bits shifted by the search pointer 431 in the cache allocation process. Likewise, the value of the search pointer 432 shows the sum of the numbers of bits shifted by the search pointer 432 in the cache allocation process.

In addition, when one of the search pointers 431 and 432 holds a numerical value exceeding the bit width of the corresponding one of the way information 411 and 412, the one of the search pointers 431 and 432 shows the position of the bit corresponding to the numerical value showing a surplus to the bit width of the corresponding one of the way information 411 and 412. For example, in FIG. 3B, the search pointer 432 of the processor 11 holds "3" and shows the bit 3 that is the third bit. In addition, for example, when the search pointer 431 of the processor 10 holds "38", the bit widths are 16, and thus 38 mod 16=6 is satisfied. Thus, the search pointer 431 shows the bit 6 that is the sixth bit.

In order to assure processing performance for each task, the initial value setting unit 490 determines a way 51 to be used for the task when the task is generated. In addition, the initial value setting unit 490 sets, as initial values to the way information 411 and 412, information of the ways 51 to be used for the respectively determined tasks. For example, the initial value setting unit 490 sets, as initial values, the way information 411 and 412 indicated by FIG. 3A and FIG. 3B when the tasks are generated.

The available way information generating unit 460 generates the available way information 421 and 422, and stores them in the way information storage unit 410. More specifically, the available way information generating unit 460 generates the available way information 421 and 422 by calculating a logical sum of the initial values of all the items of the way information 411 (or the way information 412) corresponding to the tasks included in the processor 10 (or the processor 11).

The determining unit 470 determines whether or not an unallocated way is included in each group 52 and an allocation state of each group 52 with reference to the initial value of a corresponding one of the way information 411 and 412.

The processor selecting unit 480 selects one of the processors 10 and 11 to which the unallocated way is allocated based on the result of the determination made by the determining unit 470.

The bit allocating unit 450 corresponds to an allocating unit according to the present invention, and is configured to select one or more tasks among a plurality of tasks to be executed by one of the processors 10 and 11 selected by the processor selecting unit 480 and to allocate the unallocated way to the selected task(s). More specifically, the bit allocating unit 450 selects the task(s) associated with the allocated way 51 at the valid position specified by a corresponding one of the search pointers 431 and 432.

The valid position search unit 440 corresponds to a way specifying unit according to the present invention, and is configured to cause one of the search pointers 431 and 432 to specify the way 51 allocated to one or more of the tasks of the corresponding one of the processors 10 and 11. In addition, each time the bit allocating unit 450 allocates a way 51 to one or more of the tasks of a corresponding one of the processors 10 and 11, the valid position search unit 440 shifts a way 51 that is currently being specified by a corresponding one of the search pointers 431 and 432 to a way 51 positioned next in the order of the bit sequence in a corresponding one of the available way information 421 and 422 from among ways 51 allocated to corresponding tasks of the corresponding processors.

More specifically, each time the bit allocating unit 450 allocates a way 51 to one or more of the tasks of a corresponding one of the processors 10 and 11, the valid position search unit 440 searches a corresponding one of the processor 10 and the processor 11 for a valid position in a valid position search process, and sets the searched-out valid position to the corresponding one of the search pointer 431 and the search pointer 432.

Here, valid position search processes are processes for sequentially incrementing the search pointers 431 and 432 by 1 and searching out bits that have "1" showing the validity of the bits as the available way information 421 and the available way information 422.

In other words, the valid position search unit 440 sequentially selects, in the order of bits in the bit sequence, the already allocated tasks (the tasks each having an initial value indicating that a way is already allocated to the task(s)) of a corresponding one of the processors 10 and 11.

Hereinafter, operations performed by the cache allocation control unit 40 are described taking a specific example.

FIG. 4 is a flowchart indicating a flow of processes in a cache allocation control process performed by the cache allocation control unit 40.

First, the initial value setting unit 490 sets, as initial values, the way information 411 and 412 indicated by FIG. 3A and FIG. 3B. In addition, as shown in FIG. 3A and FIG. 3B, it is assumed that the number of ways 51 is 16, and that each memory macrocell includes two ways 51. In other words, it is assumed that the sixteen ways 51 are divided into eight groups 52 each having a pair of ways 51. In addition, it is assumed that each of the processors 10 and 11 executes three tasks.

First, the available way information generating unit 460 generates available way information 421 and 422 for each of the processors 10 and 11 (Step S1001). In this way, the available way information 421 and 422 shown in FIG. 3A and FIG. 3B are generated in the process. More specifically, the logical sums of the way information 411a to 411c of the tasks 0, 1, and 2 of the processor 10 are "1" at bits 0, 6, and 7, and are "0" at the other bits. In addition, the logical sums of the way information 412a to 412c of the tasks 0, 1, and 2 of the processor 11 are "1" at bits 3, and 10, and are "0" at the other bits.

Next, the valid position search unit 440 searches the processor 10 for the valid position in the valid position search process, and sets the searched-out valid position to the search pointer 431 (Step S1002).

Hereinafter, the valid position search process is described in detail below.

FIG. 5 is a flowchart indicating the flow of the valid position search process performed by the valid position search unit 440. First, the valid position search unit 440 extracts the search pointers 431 and 432 of the specified processor n (Step S1101), and repeats the Steps S1103 and S1104 indicated below until the extracted one of the search pointers 431 and 432 completes a shift cycle corresponding to the way width (Step S1102).

Here, the valid position search unit 440 extracts the initial value "0" of the search pointer 431 of the processor 10.

First, the valid position search unit 440 determines whether or not the way 51 at the bit specified by one of the search pointers 431 and 432 of the specified processor n is an already allocated way (Step S1103). More specifically, the valid position search unit 440 determines whether or not the bit that is included in a corresponding one of the available way information 421 and 422 and specified by a corresponding one of the search pointers 431 and 432 is "1" indicating that the bit is valid or "0" indicating that the bit is invalid.

Here, the search pointer 431 shows "0", and the bit 0 of the available way information 421 shows valid "1" (Yes in Step S1103), the valid position search unit 440 determines the bit 0 as indicating the valid position of the processor 10, and sets "0" to the search pointer 431.

Again with reference to FIG. 4, a description is given below.

Next, the valid position search unit 440 searches the processor 11 for the valid position in a valid position search process, and sets the searched-out valid position to the search pointer 432 (Step S1003).

In this case, as shown in FIG. 5, the valid position search unit 440 first extracts the initial value "0" of the search pointer 432 of the processor 11 (Step S1101).

Next, the valid position search unit 440 determines whether or not the bit 0 that is of the available way information 422 and is specified by the search pointer 432 is valid "1" or invalid "0" (Step S1103). Here, the bit 0 of the available way information 422 is invalid "0" (No in Step S1103), the valid position search unit 440 adds 1 to the search pointer 432 (Step S1104).

Next, the valid position search unit 440 determines whether or not the bit 1 that is of the available way information 422 and is specified by the search pointer 432 is valid "1" or invalid "0" (Step S1103). Here, the bit 1 of the available way information 422 is invalid "0" (No in Step S1103), the valid position search unit 440 further adds 1 to the search pointer 432 (Step S1104).

The valid position search unit 440 sequentially repeats the processes of Steps S1103 and S1104 until the search pointer 432 reaches the bit that is shown by valid "1" in the available way information 422. In this example, the Steps S1103 and S1104 are repeated until the search pointer 432 reaches "3". In this way, the valid position search unit 440 determines the bit 3 as indicating the valid position of the processor 11, and sets "3" to the search pointer 432.

In addition, when one of the search pointers 431 and 432 completes a shift cycle corresponding to the bit width (Yes in Step S1102), the valid position search unit 440 sets the maximum value to the one of the search pointers 431 and 432, and completes the processing loop (Step S1105). Such a maximum value shows absence of any valid bit. Thus, when the maximum value is set to one of the search pointers 431 and 432, it is judged that the maximum value is larger than the other in a later-described bit position comparison (Step S1006), and a task for which a valid bit is left is to be selected based on the judgment. For example, the maximum value is obtained according to (Bit width)×(Bit width).

Again with reference to FIG. 4, a description is given below.

Next, the cache allocation control unit 40 divides each of the available way information 421 and 422 into two bits corresponding to a group of ways, and sequentially performs, on the two bits, the processes of Steps S1005 to S1019 indicated below (Step S1004).

First, the determining unit 470 determines the states (valid or invalid) of the bit i and the bit i+1 of the available way information 421 and 422 (Step S1005). Hereinafter, the states of the bit i and the bit i+1 of the available way information 421 and 422 are indicated in the form of "(the state of bit i+1, and the state of bit i)".

Here, based on the initial values of the way information 411 and 412, the determining unit 470 determines each of the states from among the following states: (i) none of a plurality of ways 51 included in a group 52 is allocated to any of tasks (specifically, Processor 10=(0, 0) and Processor 11=(0, 0) in Step S1005); (ii) each of at least one way 51 is already allocated to one or more of the tasks, and each of at least one way 51 is not yet allocated to any of the tasks (specifically, Processor 10=(0, 1) and Processor 11=(0, 0), or Processor 10=(1, 0) and Processor 11=(0, 0), or Processor 10=(0, 0) and Processor 11=(0, 1), or Processor 10=(0, 0) and Processor 11=(1, 0) in Step S1005); and (iii) each of all the ways 51 are already allocated to one or more of the tasks (the other case in Step S1005).

In addition, when each of at least one way 51 is already allocated to one or more of the tasks and each of at least one way 51 is not yet allocated to any of the tasks, the processor selecting unit 480 selects one of the processors 10 and 11 as the processor which executes the task(s) associated with the allocated way 51.

In addition, when none of a plurality of ways 51 included in a group 52 is allocated to any of the tasks, the processor selecting unit 480 selects one of the processors 10 and 11 that has the smaller numerical value among the values of the search pointers 431 and 432 (Step S1006).

In addition, when each of all the ways 51 is already allocated to one or more of the tasks, the cache allocation control unit 40 does not perform further task allocation for the current group 52, and shifts to the processing of a next group 52.

In this case, the cache allocation control unit 40 determines the states of the bits 0 and 1 included in a group 0. The bits 1 and 0 in the available way information 421 of the processor 10 are (0, 1), and the bits 1 and 0 in the available way information 422 of the processor 11 are (0, 0). In other words, since the way 51 is allocated to the task(s) to be executed by the processor 10, the processor selecting unit 480 selects the processor 10. Next, the bit allocating unit 450 performs bit allocation process of allocating the bit i+1 (bit 1) not associated with any allocated task to the task of the processor 10 selected by the processor selecting unit 480 (Step S1011).

Here, the bit allocation process is a process of allocating an unallocated way to one or more tasks.

The bit allocation process is described in detail below.

Figure 6:
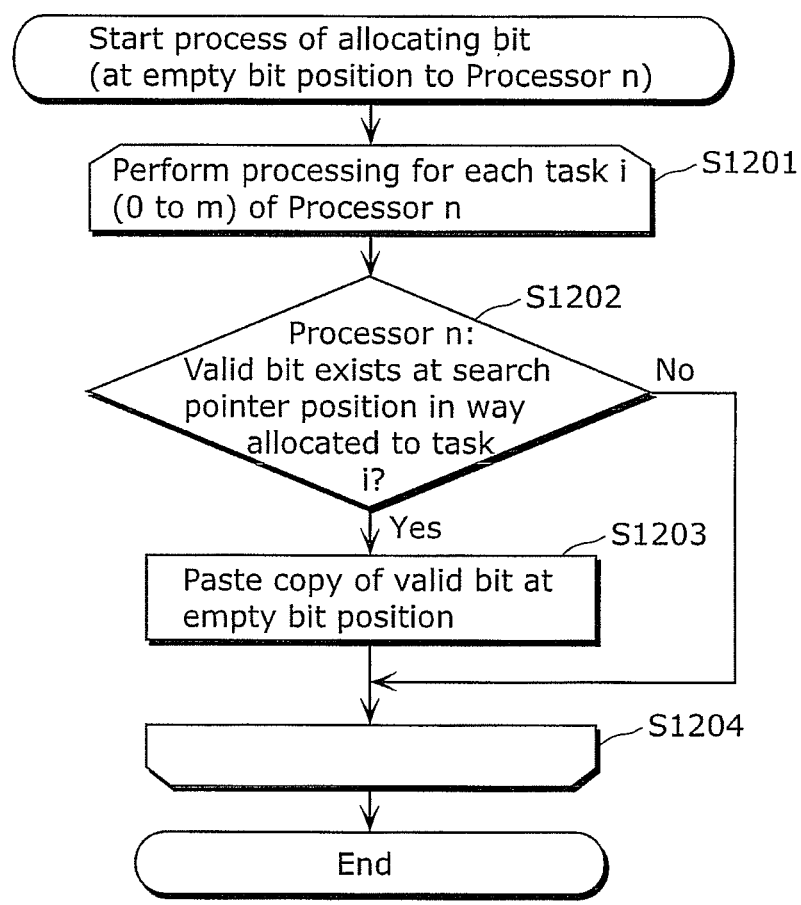
FIG. 6 is a flowchart indicating operations performed by a bit allocation unit according to the embodiment of the present invention.

FIG. 6 is a flowchart indicating the flow of bit allocation processes performed by the bit allocating unit 450.

The bit allocating unit 450 sequentially performs the steps S1202 to S1204 on each of the tasks 0 to m of the processor n selected by the processor selecting unit 480 (Step S1201).

First, the bit allocating unit 450 selects a task i (i=0 to m) among tasks 0 to m of the processor n. The bit allocating unit 450 determines whether or not the bit specified by one of the search pointers 431 and 432 of the selected task i is valid "1" or invalid "0" with reference to one of the way information 411 and 412 (Step S1202).

When the bit specified by one of the search pointers 431 and 432 of the task i is valid "1" (Yes in Step S1202), the bit allocating unit 450 pastes a copy of the valid bit to the empty bit (Step S1203). In other words, the bit allocating unit 450 changes, to valid "1", the empty bit of the one of the way information 411 and 412 of the task i. Here, among the bit i and the bit i+1, the empty bit is a bit without any allocated task (the bit that is in one of the available way information 421 and 422 and is invalid "0").

Next, the bit allocating unit 450 selects another task of the processor n, and performs the process of Step S1202 on the selected task.

On the other hand, when the bit specified by one of the search pointers 431 and 432 is invalid "0" (No in Step S1202), the bit allocating unit 450 does not change the corresponding one of the way information 411 and 412 of the task i, and performs the process of Step S1202 on the next task.

Figure 7A:
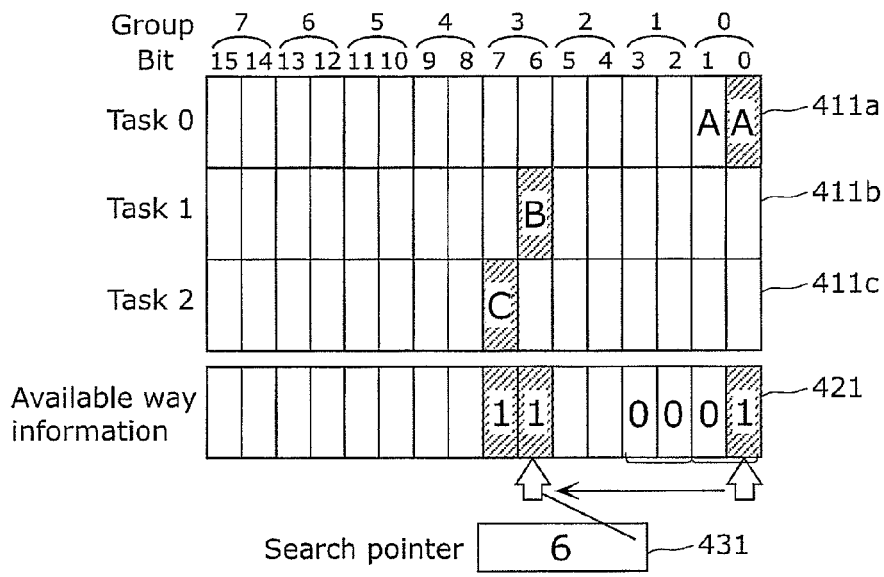
FIG. 7A is a diagram showing an example of a state at a middle of processing performed by the way information storage unit according to the embodiment of the present invention.

In this example, as shown in FIG. 3A, the search pointer 431 of the processor 10 shows "0", and the bit 0 of the way information 411a among the bits 0 of the way information 411a to 411c is valid "1". Thus, as shown in FIG. 7A, the bit allocating unit 450 sets valid "1" to the bit 1 of the way information 411a to allocate the way 51 corresponding to the bit 1 to the task 0 of the processor 10.

Again with reference to FIG. 4, a description is given below.

Next, the valid position search unit 440 searches the processor 10 for the valid position (Step S1012). Here, as shown in FIG. 7A, the valid position search unit 440 determines the bit 6 as indicating the valid position of the processor 10, and sets "6" to the search pointer 431. The valid position search process performed here is the same as the process shown in FIG. 5. After 1 is added to the initial value ("0" in this example) of one of the search pointers 431 and 432 in Step S1101, the processes starting with Step S1102 are performed. Steps S1008, S1010, S1014, S1016, and S1018 are performed in the same manner.

Through these steps, the processes for the group 0 is completed, and processes for a group 1 are performed next.

First, the determining unit 470 determines the state of the bits 3 and 2 included in the group 1 (Step S1005). The bits 3 and 2 in the available way information 421 of the processor 10 are (0, 1), and the bits 3 and 2 in the available way information 422 of the processor 11 are (1, 0). Thus the processor selecting unit 480 selects the processor 11. Next, the bit allocating unit 450 performs bit allocation process of allocating a task of the processor 11 to a bit i (bit 2) (Step S1017).

Here, as shown in FIG. 3B, the search pointer 432 of the processor 11 shows "3", and only the bit 3 of the way information 412a among the bits 3 of the way information 412a to 412c is valid "1". Thus, the bit allocating unit 450 sets valid "1" to the bit 2 of the way information 412a to allocate the way 51 corresponding to the bit 2 to the task 0 of the processor 11.

Next, the valid position search unit 440 searches the processor 11 for the valid position (Step S1018). Here, as shown in FIG. 7B, the valid position search unit 440 determines the bit 10 as indicating the valid position of the processor 11, and sets "10" to the search pointer 432.

Through these steps, the processes for the group 1 is completed, and processes for a group 2 are performed next.

First, the determining unit 470 determines the state of the bits 5 and 4 included in the group 2 (Step S1005). The bits 5 and 4 in the available way information 421 of the processor 10 are (0, 0), and the bits 5 and 4 in the available way information 422 of the processor 11 are (0, 0). In other words, since the way 51 included in the group 52 is not allocated to any of tasks, the processor selecting unit 480 compares the search pointer 431 of the processor 10 and the search pointer 432 of the processor 11 to determine the processor having the smaller numerical value shown by the search pointer to be the processor x to which an empty bit is allocated (Step S1006).

Figure 7B:
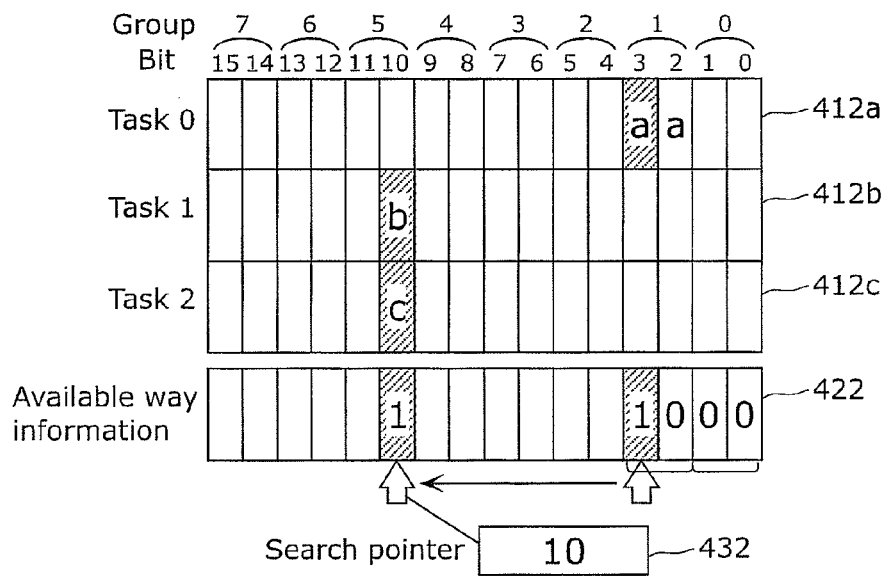
FIG. 7B is a diagram showing an example of a state at a middle of the processing performed by the way information storage unit according to the embodiment of the present invention.

Here, as shown in FIG. 7A and FIG. 7B, the search pointer 431 of the processor 10 shows "6" and the search pointer 432 of the processor 11 shows "10". Thus the processor selecting unit 480 determines the processor 10 to be the processor x to which the empty bit is allocated.

Figure 8A:
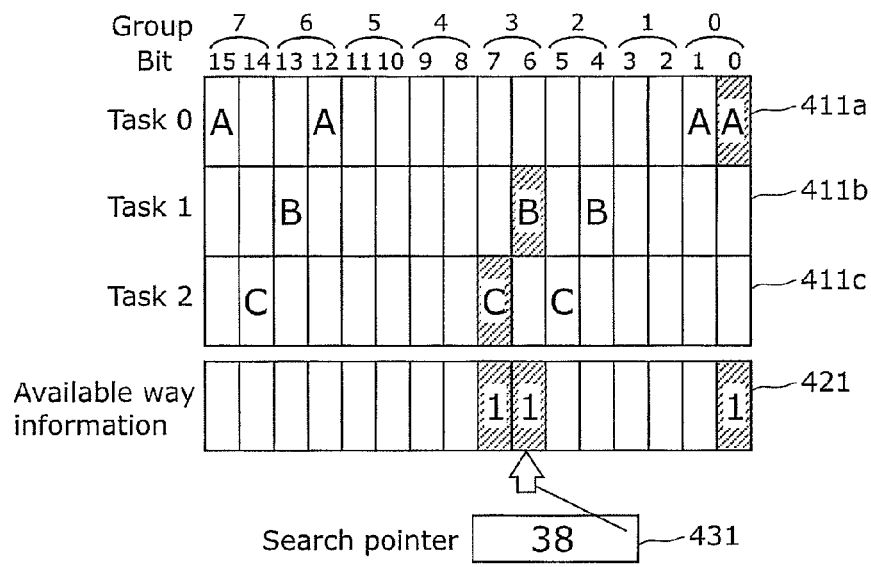
FIG. 8A is a diagram showing an example of a state at the time of completion of the processing performed by the way information storage unit according to the embodiment of the present invention.

Next, the bit allocating unit 450 allocates a bit i (bit 4) to the processor x (processor 10) (Step S1007). Here, as shown in FIG. 7A, the search pointer 431 of the processor 10 shows "6", and only the bit 6 of the way information 411b among the bits 6 of the way information 411a to 411c is valid "1". Thus, as shown in FIG. 8A, the bit allocating unit 450 sets valid "1" to the bit 4 of the way information 411b to allocate the way 51 corresponding to the bit 4 to the task 1 of the processor 10.

Next, the valid position search unit 440 searches the processor x (the processor 10) for the valid position (Step S1008). Here, the valid position search unit 440 determines the bit 7 as indicating the valid position of the processor 10, and sets "7" to the search pointer 431.

Next, the bit allocating unit 450 allocates a bit i+1 (bit 5) to the processor x (processor 10) (Step S1009). Here, the search pointer 431 of the processor 10 shows "7", and only the bit 7 of the way information 411c among the bits 7 of the way information 411a to 411c is valid "1". Thus, the bit allocating unit 450 sets valid "1" to the bit 5 of the way information 411c to allocate the way 51 corresponding to the bit 5 to the task 2 of the processor 10.

Next, the valid position search unit 440 searches the processor x (the processor 10) for the valid position (Step S1010). Here, the valid position search unit 440 determines the bit 0 as indicating the valid position of the processor 10, and sets "16" to the search pointer 431.

Through these steps, the processes for the group 2 are completed, and processes for a group 3 are performed next.

First, the determining unit 470 determines the state of the bits 7 and 6 included in the group 3 (Step S1005). The bits 7 and 6 in the available way information 421 of the processor 10 are (1, 1), and the bits 7 and 6 in the available way information 422 of the processor 11 are (0, 0). In other words, since each of all the ways 51 is already allocated to one or more of the tasks, the cache allocation control unit 40 does not change the way information 411 and 412.

Through these processes, the processing of the group 3 is completed, and processing on a group 4 is performed next.

First, the determining unit 470 determines the state of the bits 9 and 8 included in the group 4 (Step S1005). Here, the bits 9 and 8 in the available way information 421 of the processor 10 are (0, 0), and the bits 9 and 8 in the available way information 422 of the processor 11 are (0, 0). Thus, the processor selecting unit 480 compares "16" shown by the search pointer 431 of the processor 10 and "6" shown by the search pointer 432 of the processor 11 to determine the processor 11 having the smaller numerical value shown by the search pointer to be the processor x to which bits 9 and 8 are allocated (Step S1006).

Figure 8B:
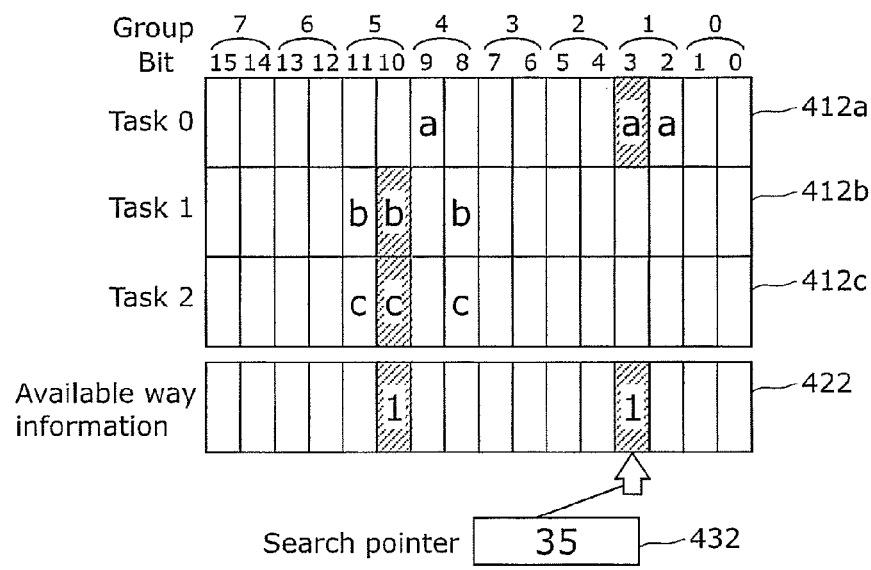
FIG. 8B is a diagram showing an example of a state after the time of the completion of the processing performed by the way information storage unit according to the embodiment of the present invention.

Next, the bit allocating unit 450 allocates a bit 8 to the processor 10 (Step S1007). Here, the search pointer 432 of the processor 11 shows "10", and the bits 10 of the way information 412b and 412c among the bits 10 of the way information 412a to 412c are valid "1". Thus, as shown in FIG. 8B, the bit allocating unit 450 sets valid "1" to the bits 8 of the way information 412b and 412c to allocate the way 51 corresponding to the bit 8 to the tasks 1 and 2 of the processor 11.

Next, the valid position search unit 440 searches the processor 11 for the valid position (Step S1008). Here, the valid position search unit 440 determines the bit 3 as indicating the valid position of the processor 11, and sets "19" to the search pointer 432.

Next, the bit allocating unit 450 allocates a bit 9 to the processor 11 (Step S1009). Here, the search pointer 432 of the processor 11 shows "19" (a bit 3), and only the bit 3 of the way information 412a among the bits 3 of the way information 412a to 412c is valid "1". Thus, as shown in FIG. 8B, the bit allocating unit 450 sets valid "1" to the bit 9 of the way information 412a to allocate the way 51 corresponding to the bit 9 to the task 0 of the processor 11.

Next, the valid position search unit 440 searches the processor 11 for the valid position (Step S1010). Here, the valid position search unit 440 determines the bit 10 as indicating the valid position of the processor 11, and sets "26" to the search pointer 432.

Through these processes, the processing on the group 4 is completed. Subsequently, the same processes are performed on groups 5 to 7.

Here, in Step S1005, when the bit i+1 and the bit i of the available way information 421 of the processor 10 are (1, 0) and the bit i+1 and the bit i of the available way information 422 of the processor 11 are (0, 0), the bit allocating unit 450 next performs bit allocation process of allocating a task of the processor 10 to the bit i (Step S1013). Next, the valid position search unit 440 searches the processor 10 for the valid position (Step S1014), and the cache allocation control unit 40 performs processing on the next group (Step S1004).

Here, in Step S1005, when the bit i+1 and the bit i of the available way information 421 of the processor 10 are (0, 0) and the bit i+1 and the bit i of the available way information 422 of the processor 11 are (0, 1), the bit allocating unit 450 next performs bit allocation process of allocating a task of the processor 11 to the bit i+1 (Step S1015). Next, the valid position search unit 440 searches the processor 11 for the valid position (Step S1016), and the cache allocation control unit 40 performs processing on the next group (Step S1004).

In addition, in the other cases in Step S1005, that is, in the case where each of the ways corresponding to the bits i+1 and i is already allocated to one or more of tasks, the cache allocating control unit 40 does not perform task allocation, and performs processing on the next group (Step S1004).

As described above, the cache control apparatus 101 according to the embodiment of the present invention sets initial values to the way information 411 and 412 so as to assure the processing performances for the respective tasks. In this way, the cache control apparatus 101 secures the cache capacity for each task in the system required to secure the processing performances.

In addition, the cache control apparatus 101 is capable of allocating each of idle unallocated ways to one or more of tasks, that is, allocating each of the idle resources to the one or more of tasks.

Furthermore, the cache control apparatus 101 allocates each of the unallocated ways to one or more of tasks of a corresponding one of the processors 10 and 11 having a task associated with a way 51 of a group 52 (memory macrocell) including the unallocated way. In this way, the way 51 included in the group 52 is allocated to the one or more of tasks to be executed by the corresponding one of the processors 10 and 11. Thus, the cache control apparatus 101 prevents cache access collision that occurs if different processors 10 and 11 access the way 51 included in the group 52. In this way, the cache control apparatus 101 according to the embodiment of the present invention is capable of reducing occurrence of access delay.

In addition, when none of the ways 51 included in the group 52 are allocated to any of the tasks, the cache control apparatus 101 allocates the way 51 included in the group 52 to the one or more of tasks to be executed by one of the processors 10 and 11 that has the smaller numerical value shown by the one of the search pointers 431 and 432. In this way, the cache control apparatus 101 is capable of preferentially allocating the way 51 to the task of the processor 10 or 11 that has the smaller number of allocated ways 51. In this way, the cache control apparatus 101 is capable of evenly allocating the ways 51 to the respective processors 10 and 11.

In addition, the valid position search unit 440 updates the search pointers 431 and 432 each time of allocating a way 51 to one or more tasks, and repeats, sequentially in a predetermined order, selecting one or more of tasks to be executed by a corresponding one of the processors 10 and 11. In addition, the bit allocating unit 450 allocates the available way 51 to the selected task(s). In this way, the cache control apparatus 101 is capable of evenly allocating the ways 51 to the respective processors 10 and 11.

Although there is no specification of a trigger that causes the cache allocation control unit 40 to perform a cache allocation control process, execution of the process at the time when a task is started or completed makes it possible to allocate unallocated ways without affecting the task processing. Although each of groups 52 includes two ways 51 in the above description, three or more ways 51 may be included instead. Alternatively, each of the respective groups 52 may include a different number of ways 51.

Furthermore, each of the processing units of the cache control apparatus 101 according to the embodiment typically functions when a processor such as a CPU executes a program (software).

Furthermore, the present invention may be the aforementioned program, or a recording medium such as a CD-ROM having the program recorded thereon. As a matter of course, the program can be distributed by, for example, downloading the software via a transmission media such as the Internet.

It is to be noted that part or all of the processing units of the cache control apparatus 101 according to the embodiment may be implemented as an LSI that is an integrated circuit. Each of the processing units may be individually configured as a chip. Alternatively, part or all of the processing units may be integrated into a single chip.

Here, an integrated circuit may be called as an IC, a system LSI, a super LSI, or an ultra LSI depending on the integration although the integrated circuit here is called an LSI.

In addition, such integration may be achieved in form of not an LSI but an exclusive circuit or a general processor. It is also possible to use a Field Programmable Gate Array (FPGA) that is programmable after the LSI is manufactured, and a reconfigurable processor in which connections and settings of circuit cells within the LSI are reconfigurable.

As a matter of course, the present invention is not limited to the above-described embodiment. Various kinds of modifications are possible and included within the scope of the present invention.

Although only an exemplary embodiment of the present invention has been described in detail above, those skilled in the art will readily appreciate that many modifications are possible in the exemplary embodiment without materially departing from the novel teachings and advantageous effects of the present invention. Accordingly, all such modifications are intended to be included within the scope of the present invention.

INDUSTRIAL APPLICABILITY

As described above, the present invention is applicable to cache control apparatuses and cache control methods. In addition, the present invention is applicable to processor systems each including a plurality of processors and a cache memory.

What is claimed is:

1. A cache control apparatus which controls a set-associative cache memory shared by a plurality of processors, wherein the cache memory includes a plurality of ways,
   said cache control apparatus comprising a cache allocation control unit configured to perform a cache allocation process of allocating each of the ways to one or more of tasks which are executed by the processors, wherein:
   the ways are divided into groups that are memory macrocells, each of the groups including one or more of the ways,
   said cache allocation control unit is configured to search for an unallocated way, in a case where said cache allocation control unit finds an unallocated way which is included in one of the groups and the one of the groups includes a way allocated to one of the tasks which is executed by a corresponding one of the processors, said cache allocation control unit is configured to allocate the found unallocated way to a corresponding one of the tasks which is executed by the corresponding one of the processors, and in a case where said cache allocation control unit finds an unallocated way which is included in one of the groups and the one of the groups does not include any one of the ways allocated to the tasks, said cache allocation control unit is configured to assign one of the tasks to the found unallocated way.

2. The cache control apparatus according to claim 1, wherein in the case where none of the ways included in the one of the groups is already allocated to any of the tasks, said cache allocation control unit is configured to allocate each of the ways included in the one of the groups to one of the tasks which is executed by one of the processors having a smallest number of tasks which are already associated, in the cache allocation process, with corresponding ones of the ways.

3. The cache control apparatus according to claim 1, further comprising a storage unit configured to store way information indicating each of the ways allocated to a corresponding one of the tasks,
wherein said cache allocation control unit is configured to determine the unallocated way with reference to the way information.

4. The cache control apparatus according to claim 3,
wherein said storage unit is further configured to store a search pointer which is provided, for each of the processors, to specify one of the ways, and
said cache allocation control unit includes:
a way specifying unit configured to cause the search pointer to specify, for each of the processors, one of the ways which is already allocated to a corresponding one of the tasks of the processor; and
an allocating unit configured to allocate the unallocated way to the one or more tasks associated, by the allocation, with the way specified by the search pointer, the one or more tasks being included in the tasks which are executed by the processor, and
wherein said way specifying unit is configured to shift the way specified by the search pointer to a next one of the ways which is positioned next in a predetermined order from among some of the ways each of which is already associated with a corresponding one of the tasks of the processor, the shift being made each time one of the ways is allocated to a corresponding one of the tasks by said allocating unit.

5. The cache control apparatus according to claim 4,
wherein said cache allocation control unit further includes
an available way information generating unit which is provided for each of the processors, and is configured to generate available way information including a bit sequence and store the available way information in said storage unit,
the bit sequence includes bits each of which is associated with a corresponding one of the ways and indicates whether or not the corresponding one of the ways is already allocated to one of the tasks each of which is executed by the corresponding one of the processors, and
said way specifying unit is configured to shift the way which is specified by the search pointer to the next one of the ways positioned next in an order of the bits in the bit sequence from among the some of the ways already associated with corresponding one of the tasks of the processor, the shift being made each time the one of the ways is allocated to the corresponding one of the tasks by said allocating unit.

6. The cache control apparatus according to claim 1,
wherein said cache allocation control unit is configured to perform the cache allocation process at a time when some of the tasks are generated or canceled.

7. A cache control method of controlling a set-associative cache memory shared by a plurality of processors, wherein the cache memory includes a plurality of ways,
said cache control method comprising:
performing cache allocation process of allocating each of the ways to one or more of tasks which are executed by the processors, wherein:
the ways are divided into groups that are memory macrocells, each of the groups including one or more of the ways,
said performing of the cache allocation process includes searching for an unallocated way, and
in said performing of the cache allocation process,
in a case where an unallocated way which is included in one of the groups is found, the one of the groups including a way allocated to one of the tasks of which is executed by a corresponding one of the processors, the found unallocated way is allocated to a corresponding one of the task which is executed by the corresponding one of the processors, and
in a case where an unallocated way which is included in one of the groups is found, the one of the groups not including any one of the ways allocated to the tasks, one of the tasks is assigned to the found unallocated way.

* * * * *